United States Patent
Fan

(12) United States Patent (10) Patent No.: US 6,811,435 B1
Fan (45) Date of Patent: Nov. 2, 2004

(54) ADAPTOR FOR CONNECTION WITH CIGARETTE LIGHTER SOCKET OF AUTOMOBILE

(76) Inventor: Eagle Fan, No. 133, Cheng-Kung 6 St., Chui-Pei City, Hsinchu Hsien (TW)

( * ) Notice: Subject to any disclaimer, the term of this patent is extended or adjusted under 35 U.S.C. 154(b) by 0 days.

(21) Appl. No.: 10/672,359

(22) Filed: Sep. 27, 2003

(51) Int. Cl.[7] ............................................. H01R 33/945
(52) U.S. Cl. ...................................... 439/577; 439/669
(58) Field of Search .................. 439/577, 668, 439/669, 425, 426

(56) References Cited

U.S. PATENT DOCUMENTS 4,275,946 A * 6/1981 Manina et al. .............. 439/669
4,877,924 A * 10/1989 Mitzmacher ................ 439/577
5,238,422 A * 8/1993 Scherer ....................... 439/668
6,290,545 B1 * 9/2001 Wang et al. ................. 439/668

* cited by examiner

Primary Examiner—Tho D. Ta
Assistant Examiner—Felix O. Figueroa

(57) ABSTRACT

An adaptor includes a body sized to fit into a cigarette lighter holder generally formed inside an automobile to form electrical connection with an electrical system of the automobile. The adaptor includes a casing having a front end to which a positive terminal is mounted and a side surface to which resilient negative terminals are mounted. The positive terminal has a sharp tip projecting out of the casing for helping a user to break a car window. A cutter having a sharp edge is movably attached to the side surface of the adaptor to help the user to cut off a safety belt by which the user is secured in a seat inside the car.

5 Claims, 7 Drawing Sheets

ADAPTOR FOR CONNECTION WITH CIGARETTE LIGHTER SOCKET OF AUTOMOBILE

BACKGROUND OF THE INVENTION

1. Field of the Invention

The present invention relates generally to an electrical adaptor for connection with cigarette lighter socket of automobile dashboard, and in particular to an electrical adaptor in which emergency escape tools are incorporated for helping a driver and passengers of the automobile to escape out of an automobile damaged in accidents.

2. The Related Art

Traffic accidents often cause serious damage to automobile body, as well as electrical and power systems. Such damages may lead to fires in leakage of fuel happens. Escaping out of a damaged car is one of the most important things for the driver and passengers of the damaged car. This not only helps to save lives but also gives the driver and the passengers a chance to warn the drivers of the following cars in order to prevent further damages.

Windows of the automobiles that are available in the automobile market are power operated, rather than manually operated. Thus, once the power and electrical systems of an automobile malfunction due to for example damage to the automobile caused by collision, if unfortunately, the doors of the automobile jam, the only way for passengers to get out of the automobile is to break the window glass. Automobile window glass is generally reinforced glass, which cannot be broken by bare hands. A tool with sharp and rigid tips is needed in breaking car windows. Although people may store such a tool inside the automobile, it is somehow possibly difficult for them to access the tool or they simply forget where they put the tool. As a consequence, they may get trapped in the damage automobile without escape.

Thus, the present invention is aimed to provide an electrical adaptor that is received and retained in a cigarette lighter socket of an automobile for ready access by a person so as to help escape of the person out of the automobile during a traffic accident.

SUMMARY OF THE INVENTION

Therefore, a primary object of the present invention is to provide an electrical adaptor engageable with a cigarette lighter socket of an automobile to connect an electrical or electronic device to an electrical system of the automobile.

Another object of the present invention is to provide an electrical adaptor in which emergency escape tools are incorporated to help passengers of automobile to escape out of the automobile during a traffic accident.

A further object of the present invention is to provide a device featuring with electrical adaptor and emergency escape tool whereby market competitivity is enhanced.

Yet a further object of the present invention is to provide a hands-free mobile phone holder, which provides a connection between the mobile phone and an electrical system of an automobile, while incorporating emergency escape tool to help escape of passengers out of the automobile in a traffic accident.

A further object of the present invention is to provide a readily accessible escape tool for escape of passengers out of an automobile in a traffic accident.

To achieve the above objects, in accordance with the present invention, there is provided an adaptor sized to fit into a cigarette lighter holder generally formed inside an automobile to form electrical connection with an electrical system of the automobile. The adaptor comprises a casing having a front end to which a positive terminal is mounted and a side surface to which resilient negative terminals are mounted. The positive terminal has a sharp tip projecting out of the casing for helping a user to break a car window. A cutter having a sharp edge is movably attached to the side surface of the adaptor to help the user to cut off a safety belt by which the user is secured in a seat inside the car.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
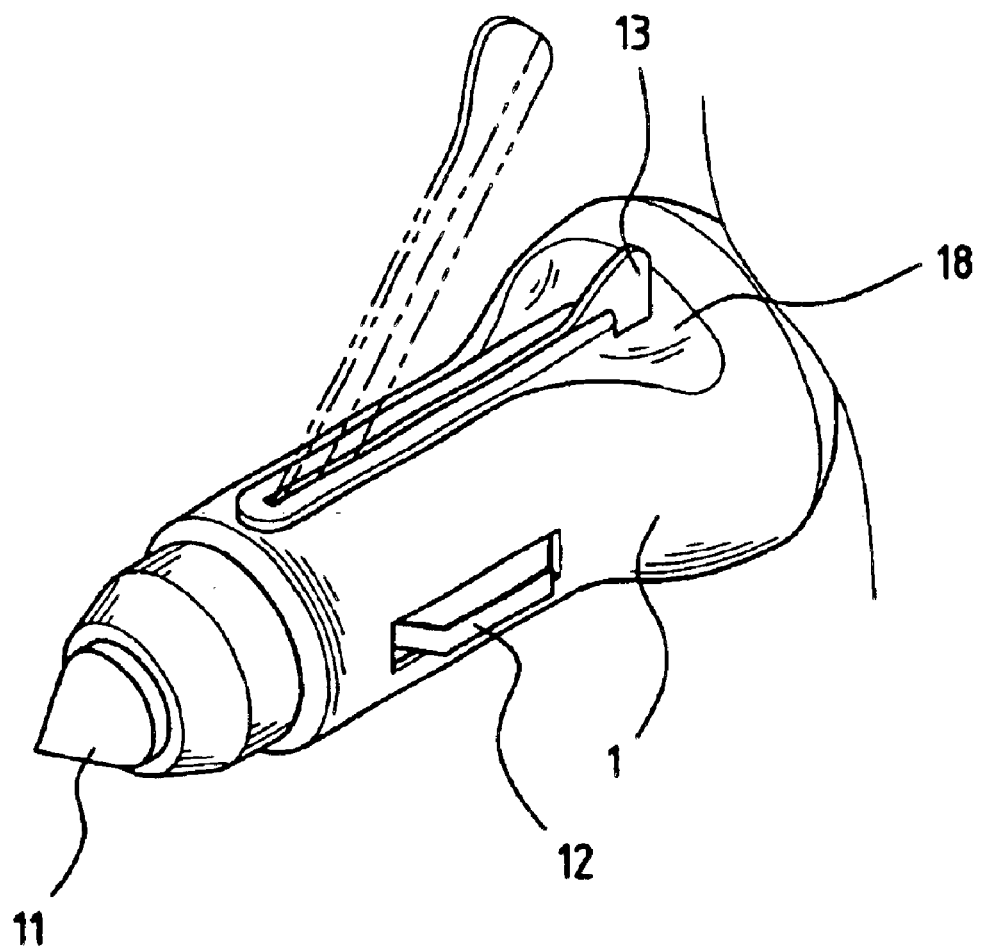
FIG. 1 is a perspective view of an electrical adaptor constructed in accordance with the present invention in which phantom lines show a cutter in an expanded operation position.

With reference to the drawings and in particular to FIG. 1, an electrical adaptor constructed in accordance with the present invention, generally designated with reference numeral 1, comprises a body having a cylindrical casing (not labeled) preferably made of electrical insulation material, having a front end to which a positive terminal 11 is movably mounted. Recesses (not labeled) are defined in a side surface of the casing for receiving and retaining negative terminals 12 that are made resilient. The casing is configured and sized to fit into a cigarette lighter socket of an automobile (not shown) whereby the positive terminal 11 and the negative terminals 12 respectively engage corresponding contacts inside the cigarette lighter socket to form electrical connection therebetween. The resiliency of the negative terminals 12 helps retaining the adaptor 1 within the socket.

In accordance with the present invention, the positive terminal 11 that is movably mounted to the front end of the casing has a conic front end portion having a sharp tip, which can serve as a sharp tool for breaking automobile windows. Further, a slot (not labeled) is defined in the side surface of the casing to receive a cutter 13 that can be withdrawn out of the slot for helping automobile passengers to cut off safety belts that secure the passengers in the automobile seats.

Figure 2:
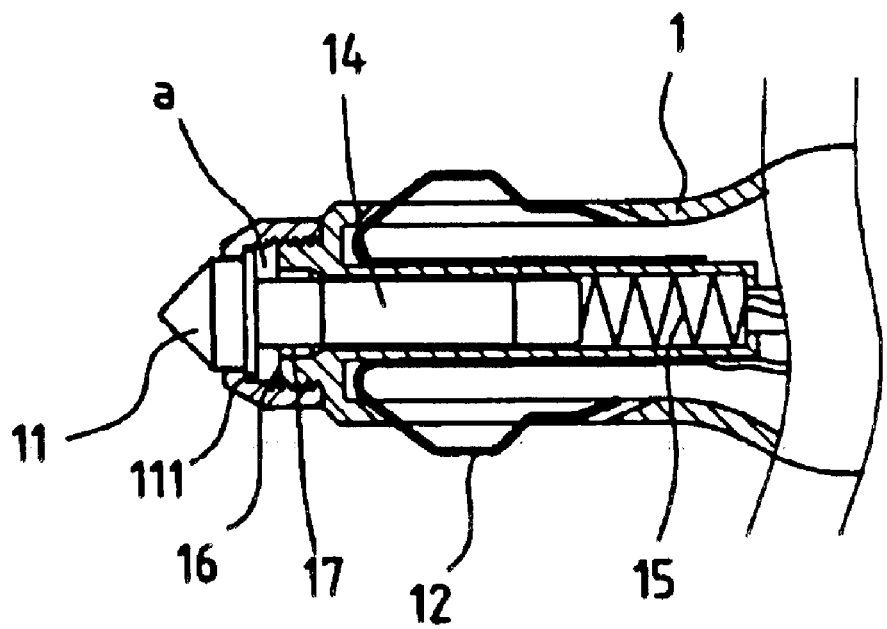
FIG. 2 is a cross-sectional view of the electrical adaptor of the present invention.
Figure 5:
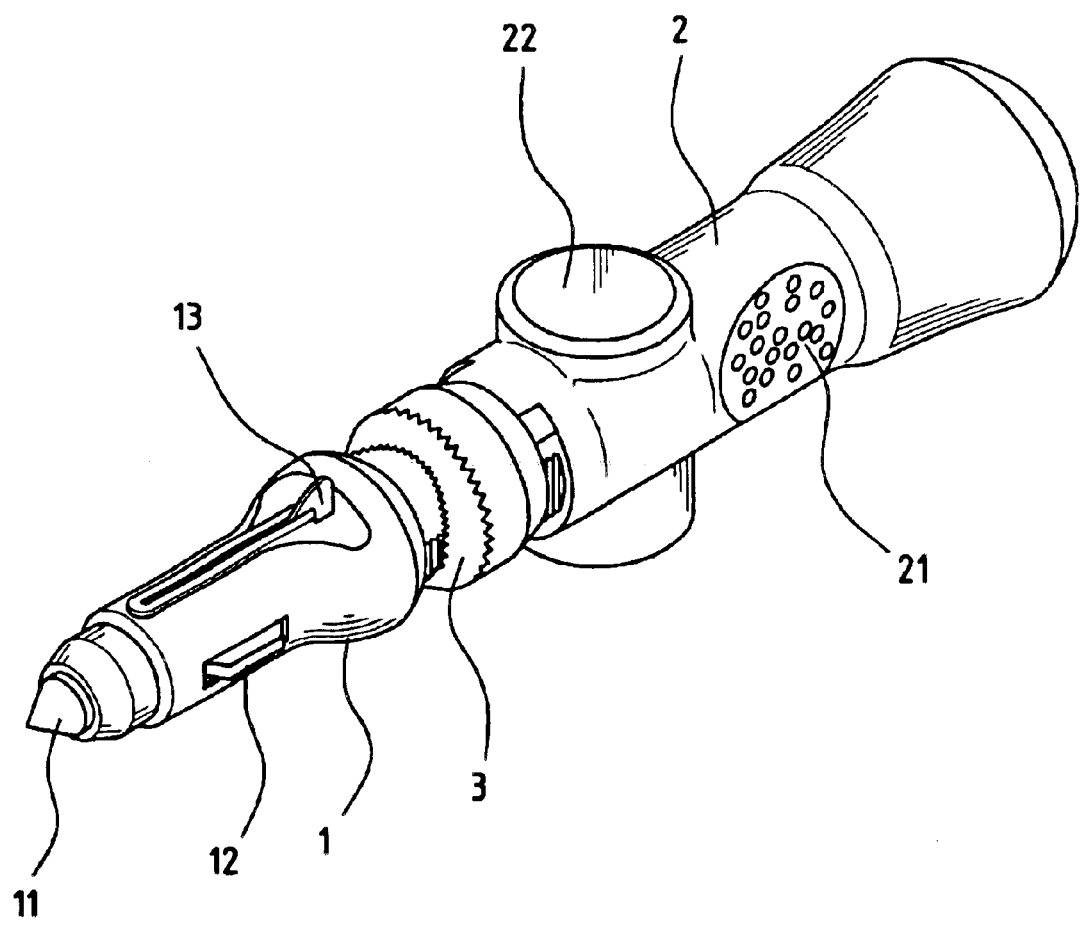
FIG. 5 is a perspective view of the electrical adaptor with a hands-free mobile phone holder attached thereto.
Figure 6:
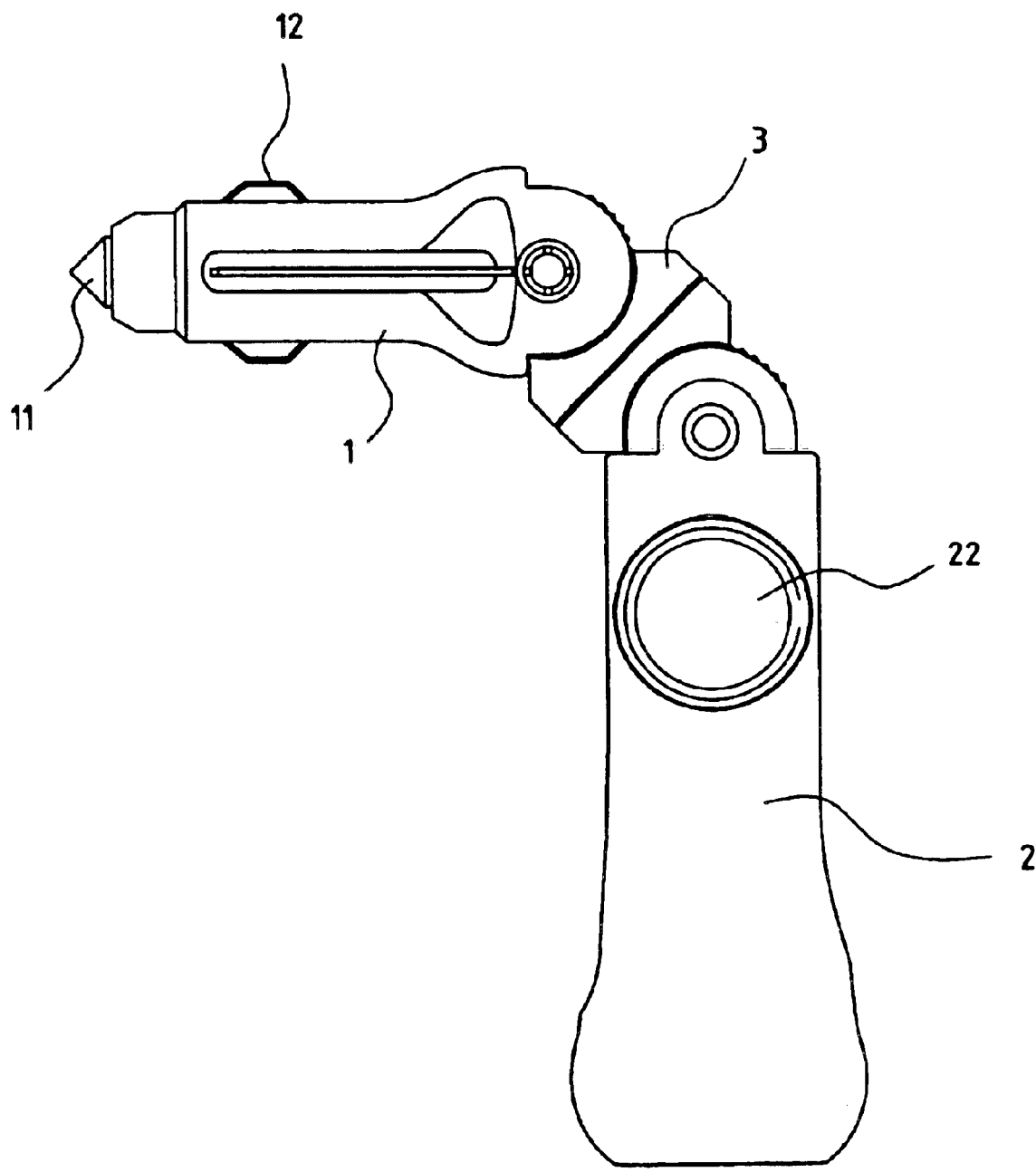
FIG. 6 is plan view of FIG. 5 with the electrical adaptor bent in a right-angled configuration.

Also referring to FIG. 2, the casing of the adaptor 1 defines a blind central hole 17 having an opening toward the front end of the casing. A fuse 14 is movably received in the hole 17 and biased toward the opening by a helical spring 15 for electrically engaging the positive terminal 11. Thus, the positive terminal 11 is biased to partially project out of the front end of the casing to engage the corresponding contact of the cigarette lighter socket. The spring 15 that is made of conductive material is connected with an electrical wire (not labeled) extending rearward out of the casing for electrical connection with an electrical or electronic device, such as a hands-free mobile phone holder 2 (FIGS. 5 and 6).

The casing defines a cavity (not labeled) in a front end portion thereof for receiving the positive terminal 11. The cavity is in communication with and preferably concentric with the central hole 17 of the casing. The positive terminal 11 is a short cylinder having a conical front end portion and forming a circumferential flange 111 at a rear end thereof. The flange 111 is engageable with an inward flange (not labeled) of the cavity to prevent the positive terminal 11 from disengaging from the casing. A gap or distance a is present between the rear end face of the positive terminal and a circumferential shoulder or an inner wall 16 formed between the cavity and the central hole 17. The distance a, which is smaller than the overall amount of deformation that the spring 15 may take, allows for the movement of the positive terminal 11 against the spring 15. The shoulder 16 helps to support and fix the positive terminal 11 when a user attempts to hit and break an automobile window with the sharp tip of the adaptor 1.

The negative terminals 12 are made of resilient wires having irregular shape that partially project out of the side surface of the casing for engagement with corresponding contacts inside the cigarette lighter socket. The resiliency of the negative terminals 12 helps retaining the adaptor 1 in the socket. Electrical wires (not labeled) are connected to at least one of the negative terminals 12 and extend out of the casing for engagement with the electrical or electronic device 2.

Figure 3:
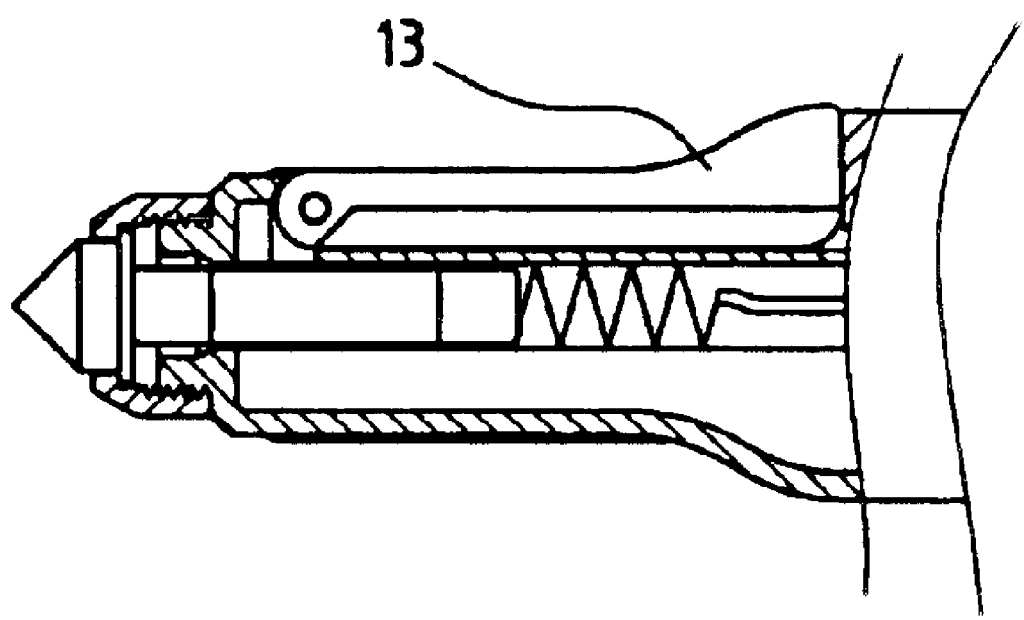
FIG. 3 is another cross-sectional view of the electrical adaptor of the present invention.
Figure 4:
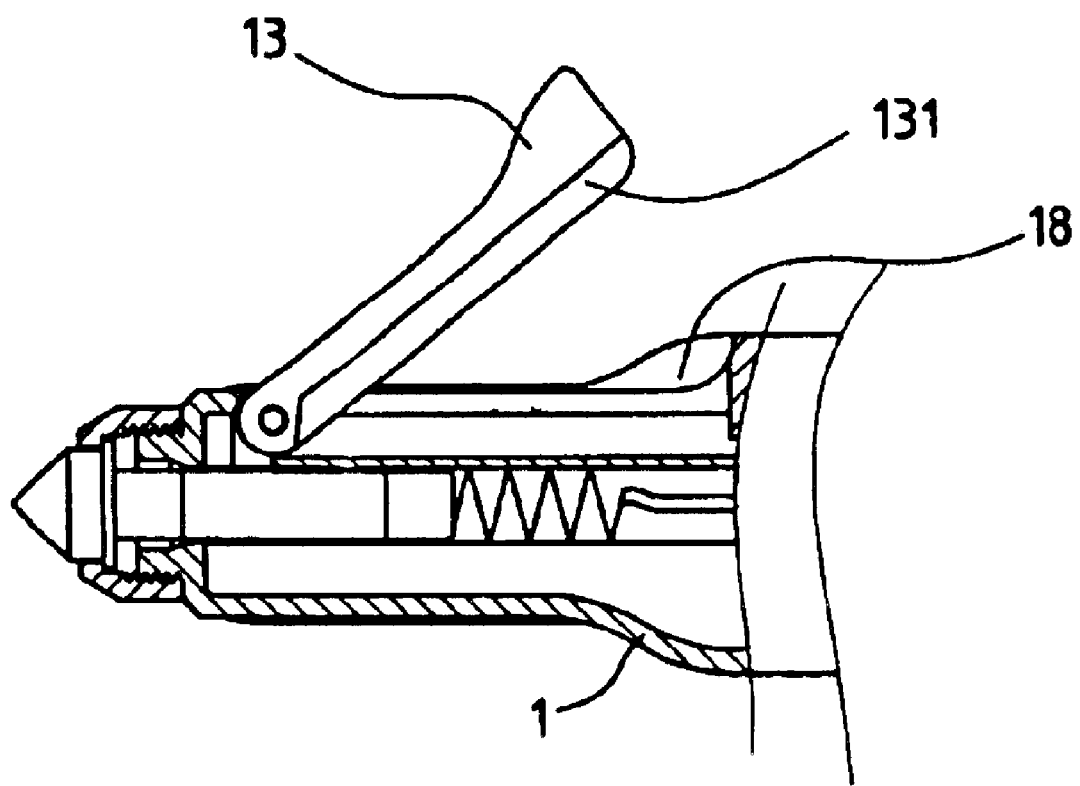
FIG. 4 is similar to FIG. 3, but showing the cutter in the expanded operation position.

Also referring to FIGS. 3 and 4, the cutter 13 is in the form of a blade having an inner sharp edge 131. The cutter 13 is pivoted at an end thereof to the casing whereby the cutter 13 is rotatable about the pivot between a stowed position within the slot defined in the casing as shown in FIG. 3 and an expanded operation position as shown in FIG. 4. In the operation position, the sharp edge 131 of the cutter 13 forms an included angle with the side surface of the casing for receiving an article to be cut off, such as a portion of a safety belt of the automobile. By forcibly rotating the butter 13 back into the slot, the safety belt is cut off by the sharp edge 131. To help a person to access the cutter 13 with his or her fingers, recesses 18 are defined in the casing on opposite sides of or next to or adjacent to the cutter 13, which are large enough to accommodate finger tips whereby a user may grip and move the cutter 13 out of the slot by his or her fingers.

Referring to FIG. 5, in practical applications, a hands-free mobile phone holder 2 can be attached to the rear end of the adaptor 1 by means of a connection structure 3 for electrical connection with the electrical system of the automobile. In the embodiment illustrated, the mobile phone holder 2 comprises a casing inside which a loud speaker 21 is mounted. A socket 22 is defined in the casing for receiving a cigarette lighter (not shown) or a plug of other electrical devices. The socket 22 comprises contacts (not shown) in electrical connection with the electrical system of the automobile via the adaptor 1.

The connection structure 3 allows for angular displacement of the mobile phone holder 2 with respect to the adaptor 1 whereby the mobile phone that is retained by the mobile phone holder 2 is position- and angle-adjustable with respect to the cigarette lighter socket of the dash board of the automobile for easy access by the driver or other passengers of the automobile.

Further, in a traffic accident, when a car is damaged so as to trap passengers inside the car, the passengers can remove the adaptor 1 out of the cigarette lighter socket and use the cutter 13 to cut off the safety belts, if necessary, and then using the sharp tip of the positive terminal 11 to hit and break the car window for escape. The connection structure 3 between the mobile phone holder 2 and the adaptor 1 allows the mobile phone holder 2 to be substantially perpendicular to the adaptor 1 as shown in FIG. 6. The right-angled configuration allows for easy gripping by the user.

Figure 7:
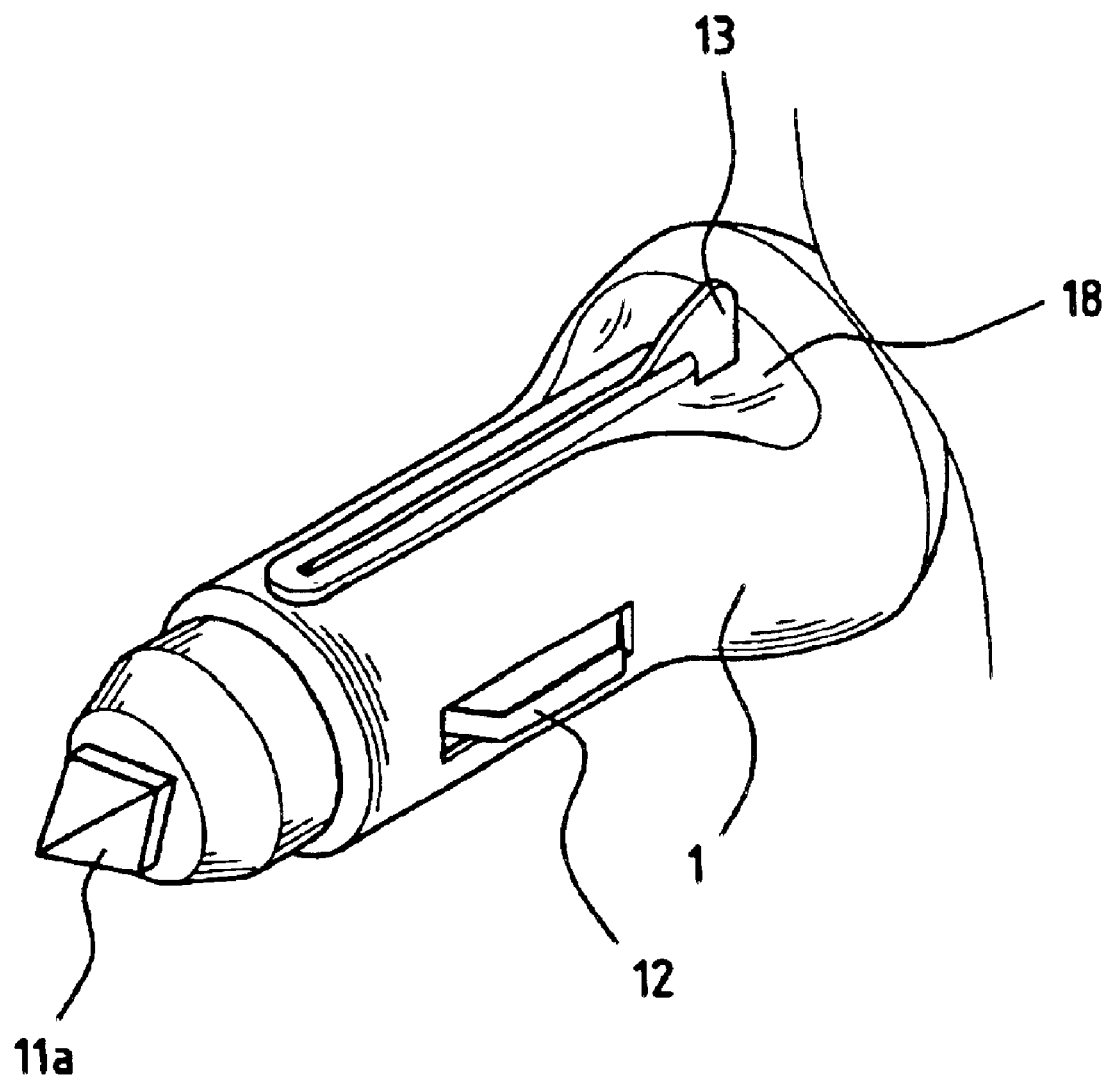
FIG. 7 is a perspective view of an electrical adaptor constructed in accordance with another embodiment of the present invention.

FIG. 7 shows another embodiment of the electrical adaptor in accordance with the present invention, where, for simplicity, identical parts are designated with the same reference numerals as those of the embodiment illustrated in FIG. 1. Thus, the electrical adaptor of FIG. 7, which is also designated with reference numeral 1, comprises a casing having a front end and a side surface. Recesses are defined in the side surface for receiving and retaining resilient negative terminals 12. A slot is also defined in the side surface for receiving a cutter 13. Recesses 18 are defined in the side surface on opposite sides of or next to the cutter 13 for easy access of the cutter 13 by user's fingers.

A positive terminal 11a having a tip of multilateral shape, such as pyramid, is movably mounted to a front end of the adaptor 1. The pyramid tip of the positive terminal 11a has exactly the same function of the conic tip of the positive terminal 11 of the previous embodiment, which helps a user to break a car window in escaping out of a damaged car. Apparently, the sharp tip of the positive terminal may assume other shapes of cross section, such as a triangular cross section, a pentagonal cross section and a hexagonal cross section.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electrical adaptor comprising a casing having a front end to which a positive terminal is mounted and a side surface on which resilient negative terminals are mounted, wires electrically connected to the positive and negative terminals, and the improvements comprising that the positive terminal has a sharp tip end projecting out of the front end of the casing, and a cutter movably mounted to the side surface of the casing.

2. The electrical adaptor as claimed in claim 1, wherein the side surface defines recesses adjacent the cutter.

3. The electrical adaptor as claimed in claim 1, wherein the casing defines a cavity in which the positive terminal is movably received, the positive terminal forming a circumferential flange engageable with an inward flange of the casing to retain the positive terminal inside the cavity, the positive terminal being spaced from an inner wall of the casing to accommodate the movement of the positive terminal with respect to the casing.

4. The electrical adaptor as claimed in claim 1, wherein the sharp tip of the positive terminal is conic.

5. The electrical adaptor as claimed in claim 1, wherein the sharp tip of the positive terminal has a multilateral shape having polygonal cross section.

* * * * *